Figure 1:
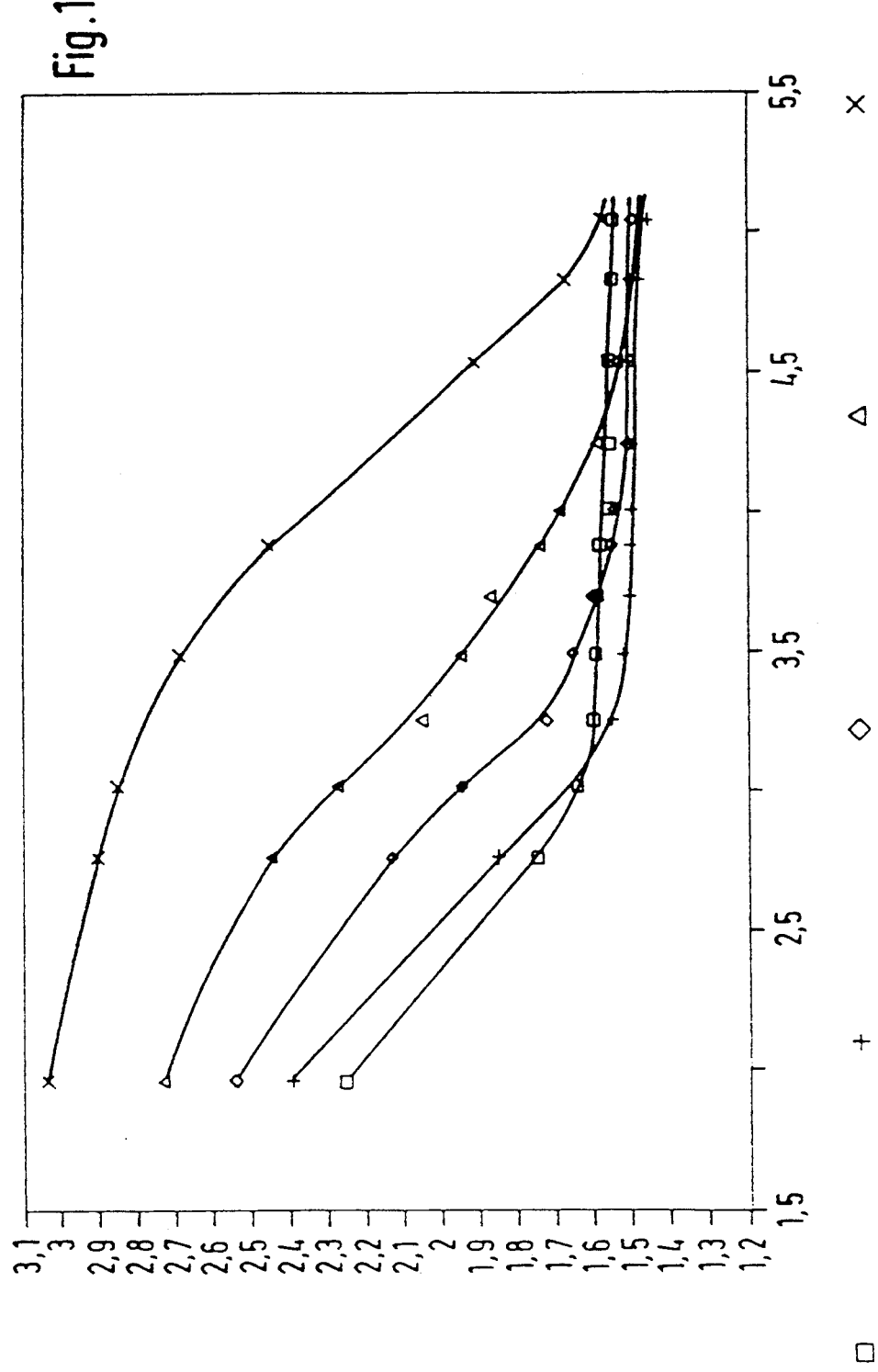

United States Patent [19]

Wulff et al.

[11] Patent Number: 5,164,427

[45] Date of Patent: Nov. 17, 1992

[54] COLUMN-PACKING MATERIAL FOR GEL-PERMATION CHROMATOGRAPHY METHOD FOR PREPARATION, AND APPLICATIONS

[75] Inventors: Gunter Wulff, Erkrath; Milan Minarik, Prag; Ralf J. Oerschkes, Willich, all of Fed. Rep. of Germany

[73] Assignee: Macherey, Nagel & Co., Duren, Fed. Rep. of Germany

[21] Appl. No.: 806,216

[22] Filed: Dec. 13, 1991

Related U.S. Application Data

[62] Division of Ser. No. 596,285, Oct. 12, 1990, Pat. No. 5,091,433.

[30] Foreign Application Priority Data

Oct. 12, 1989 [DE] Fed. Rep. of Germany ....... 3934068

[51] Int. Cl.$^5$ .............................. C08J 9/40; C08J 9/42
[52] U.S. Cl. .................................... 523/219; 210/635; 521/54; 521/134; 521/139; 521/140; 523/218; 524/577; 524/578
[58] Field of Search ................... 523/218, 219; 521/54, 521/134, 139, 140; 524/577, 578; 210/635

[56] References Cited

U.S. PATENT DOCUMENTS

| | | | |
|---|---|---|---|
| 4,242,227 | 12/1980 | Nestrick et al. | 252/42 P |
| 4,560,704 | 12/1985 | Regnier et al. | 521/31 |
| 4,699,717 | 10/1987 | Riesner et al. | 210/635 |

FOREIGN PATENT DOCUMENTS

| | | |
|---|---|---|
| 0143423 | 6/1985 | European Pat. Off. . |
| 1456865 | 12/1976 | United Kingdom . |
| 2075362 | 11/1981 | United Kingdom . |

OTHER PUBLICATIONS

Engelhardt et al, High Performance Exclusion Chromatography of Water Soluble Polymers of Chemically Bonded Stationary Phases, Journal of Chromatography, 1979, pp. 305-319.

Monrabal, Polystyrene Bonded Silica as GPC Packing: a Variable Pore Diameter Packing Concepts of GPC, J. of Chromatographic Science, 1981, pp. 79-90.

*Primary Examiner*—Morton Foelak
*Attorney, Agent, or Firm*—Joseph W. Berenato, III

[57] ABSTRACT

A column packing material to be used in gel permeation chromatography (GPC) consists of support particles with a mean particle diameter of 1 to 50 $\mu$ of which the matrix is formed by an inorganic or organic, polymeric and porous hard material with a mean pore diameter of 6 to 50 nm and a pore volume of 0.1 to 3 ml/g, the matrix pores containing chemically bound polymer chains. The column packing material of the invention is characterized in that the polymer chains consist of linear, permeable and not-crosslinked polymers with an upper exclusion limit between 200 and 200,000, the pores of the matrix being entirely filled by the polymer chains. The method of the invention is characterized in that the pores of the support particles are filled by polymer chains chemically bound to the pore surfaces, these polymer chains being permeable to solvents and partly to dissolved substances.

10 Claims, 10 Drawing Sheets

COLUMN-PACKING MATERIAL FOR GEL-PERMATION CHROMATOGRAPHY METHOD FOR PREPARATION, AND APPLICATIONS

This is a division of application Ser. No. 596,285, filed Oct. 12, 1990, now U.S. Pat. No. 5,091,433.

The object of the present invention are porous particles filled with polymeric gels, their manufacturing method and their application as chromatographic supports. By introducing the polymer gel, which for chromatographic purposes is highly advantageous, into a hard, porous matrix, such materials are exceedingly pressure resistant, non-swelling and evince good storage life even when dry while the chromatographic efficiency is excellent.

Column-packing materials are required gel-permeation chromatography (GPC) that evince high pore density, and of which the pore diameter is specified and can be controlled accurately. These conditions are met by inorganic, porous supports such as macro-porous silica gels, porous glasses or by macro-porous polymers such as copolymers of styrene and divinylbenzene. Both types evince large pores (diameters of 60 to 3,000Å) and thereby allow separating substances of higher molecular weights. To separate substances of lower molecular weights a support with smaller pores is required. Such small pores cannot be achieved with the aforementioned supports. They require homogeneously crosslinked polymer gels as supports. In that case the substances are separated by differential diffusion in the grain wherein the polymer chains build up a mesh lattice and prevent larger substances from diffusing. The basic drawback of these materials is in their low mechanical strength. The particles are quite soft and will deform at higher pressures so that, at such higher pressures, the chromatographic column will clog. Because of these drawbacks, the intrinsically highly selective and homogeneously crosslinked gels have almost disappeared from the market.

Presently special supports are used in this range of molecular weights, but their accurate manufacturing procedure is not disclosed in the literature. However these supports lack inorganic components. Their separation efficiency is very good, their pressure resistance is average, their handling properties and storage lives on the other hand are poor, and they are among the most expensive materials in HPLC and GPC. They are commercially available as PL-Gel, Styragel, TSK Gel and Shodex GPC columns.

Attempts to prepare hard particles with small pores are generally known but they have not become commercial products. Pores of silica gel have been lined with polymer layers to make the pores smaller (B. Monrabal, Chromatog Sci. 19, 79, 1981). Diffusion inside these layers was neither required nor intended and therefore mostly highly crosslinked, porous polymer layers have been used.

Again the literature discloses attempts to deactivate by polymer-coating the pore surfaces of porous solids to make them useful in GPC (for instance B. Sebille et al, European patent application 225829 A2 of 16 Jun. 1987, A. Ivanov et al, Mol. Genet. Mikrobiol. Viruso, 11, 39, 1987, Chemical Abstracts 108, 34 286 198; Y Komiya et al, Kokai Tokkyo Koho, Japanese patent 55/5941, 17 Jan. 1980). Many other works are known on preparing column materials evincing chemically bound polymer layers at the surface of the silica gel and which are meant to be used for ion exchange, reversed phase chromatography, for racemate separation etc. (for instance H Okamura et al, German Offenlegungsschrift 2730771, 12 Jan. 1978; I Shinichi et al, U.S. Pat. No. 4,140,653, 20 Feb. 1979; Figge et al, J. Chromatog. 351, 393, 1986; G Wulff et al, Reactive Polymers, 3, 261, 1985; Daicel Chemical Industries Ltd. Kogai Tokkyo Koho, Jap. patent kokai 57/147,434, 11 Sep. 1982. Y Kosaka et al, Japanese patent document kokai 51/74694, 28 Jun. 1976; A V Il'ina et al, Russian patent 687081, 25 Sep. 1979).

In all such work, the separation in the chromatographic column is by principles other than GPC. Moreover, in all instances, the polymer layers on the pore surfaces are more or less thin in order that, as is explicitly explained, the diffusion shall become as good as possible in the free spaces in the grain.

Now we discovered in surprising manner that porous materials wholly filled with homogeneous polymer gels make excellent chromatographic supports. The polymer lattice in the pore polymer gel can be determined by the number of covalently bound groups containing in turn vinyl groups and adhering to the pore surfaces of the solid as well as by the length of the polymer chains. The manufacturing methods of these particles also are an object of this invention.

In the preparation method of the invention, the molecules with polymerizing double bonds or also the molecules with other functional groups reacting into polymerization, polycondensation or polyaddition are chemically bound in concentrations of 0.01 to 6 $\mu$mole/cm$^2$ to the surface of porous solids.

Suitable porous solids are materials with an inner volume of 0.1-3 ml/g (preferably between 0.6 and 1.2 ml/g) and an average pore diameter of 6-500 nm (preferably 10-50 nm). Between 1 and 50$\mu$, preferably between 3 and 10$\mu$, the average particle size preferably shall evince a standard deviation less than 50%.

Applicable porous materials for instance are silica gel, aluminum oxide, Celite, zeolites, porous glass and furthermore polymers based on vinyl, vinylidene, methacrylate, acrylate or the like, monomers with suitable crosslinking agents such as divinylbenzene, glycoldimethylacrylate, methylene-bis-acrylamide or the like. Basically however all porous materials with sufficient inertia and mechanical strength may be used.

The bonding of the polymerizing groups also can be carried out by procedures known from the literature. Among the advantageous bonds are those halogen- or alkoxy-silanes on silica gel for instance with 3-(trimethyoxysilyl)propylmethacrylate or 4-(dimethylchlorosilyl)-styrene or of methacryl anhydride on polyhydroxy ethylene methacrylate.

The suitable concentration of the polymerizing groups on the pore surfaces is of decisive significance for the application of the invention, and this shall be discussed in further detail below. To regulate this concentration, either a varyingly large quantity is used in the reaction, or the reagent is diluted with a reagent of similar structure but lacking any polymerizing group. In every case as regards silica gel, glass, zeolites or Celite, unconverted silanol groups must be deactivated subsequently by known methods, for instance using hexamethyldisilazane or similar reagents. Groups interfering with the ultimate application must be deactivated at the surface also for other solids.

The monomer or the mixture of monomers to be polymerized will be added in a concentration of 0.1-10 g per g of porous solid so modified. Preferably the monomer volume shall be 5-100% by volume larger than the inside volume of the solid. Next the well volatile solvent is removed in a vacuum of 0.1 to 300 mbars at a temperature of 0°-100° C. In order to apply lesser quantities of monomer, the monomer is additionally diluted with a less volatile and inert solvent such as toluene, xylene. Suitable monomers are all those proper for radial polymerization (olefins, styrene derivatives, acrylic derivatives, methacrylate derivatives etc.). In this case a suitable initiator (peroxides or azo compounds from the literature) is added to the monomer mixture. Then the mixture is heated for 1-100 h at 30°-120° C. To initiate the polymerization, other methods from the literature also may be employed (anionic, cationic, coordinated polymerizations). However the monomers also may be such as to make possible polycondensation or polyaddition to build up the polymer.

After polymerization, the chemically non-bound polymer is exhaustively rinsed with a suitable solvent, i.e. a solvent in which the polymer is well soluble, and thereupon the porous material filled with the polymer is dried.

Figure 3:
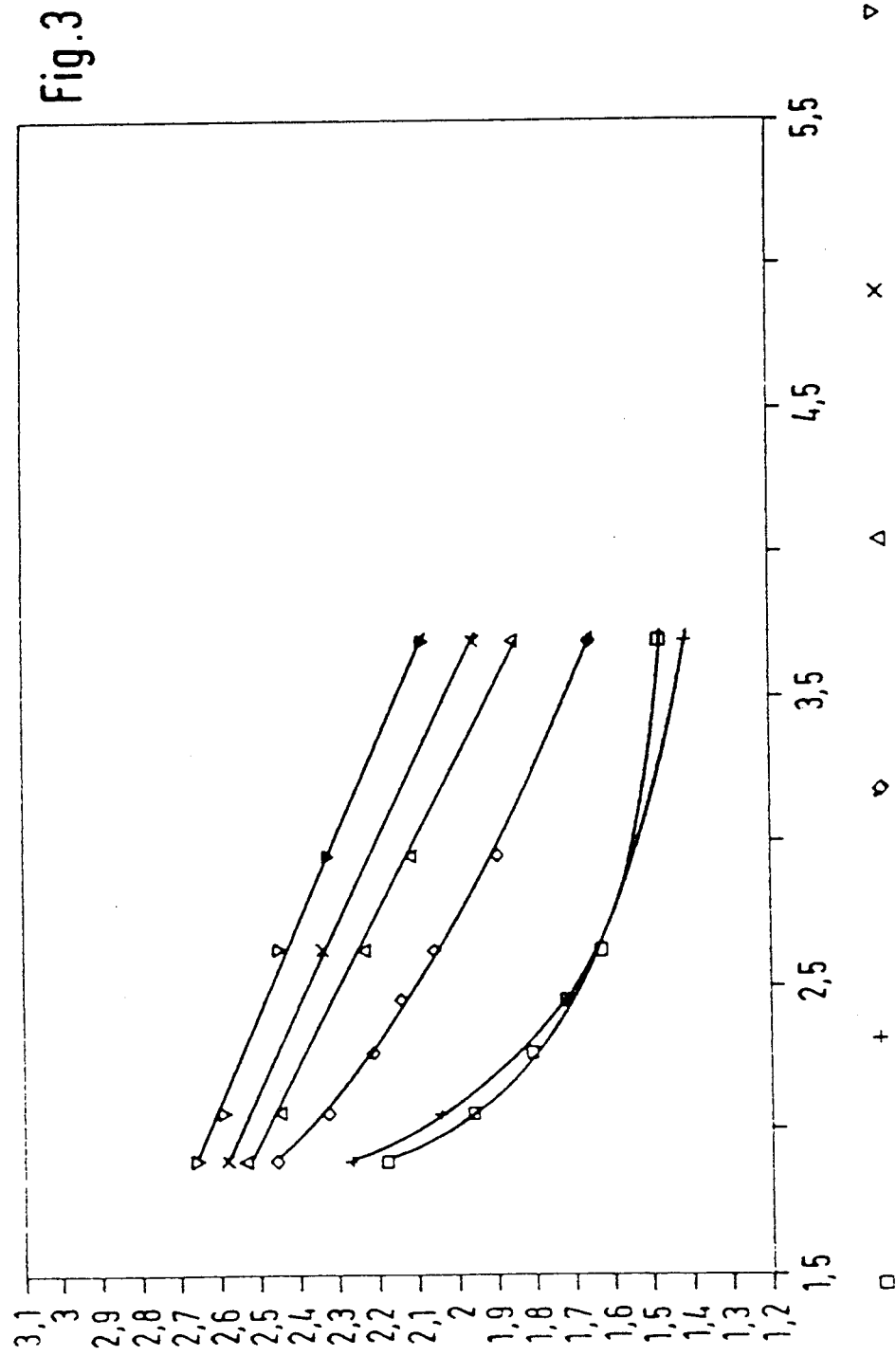
Figure 4:
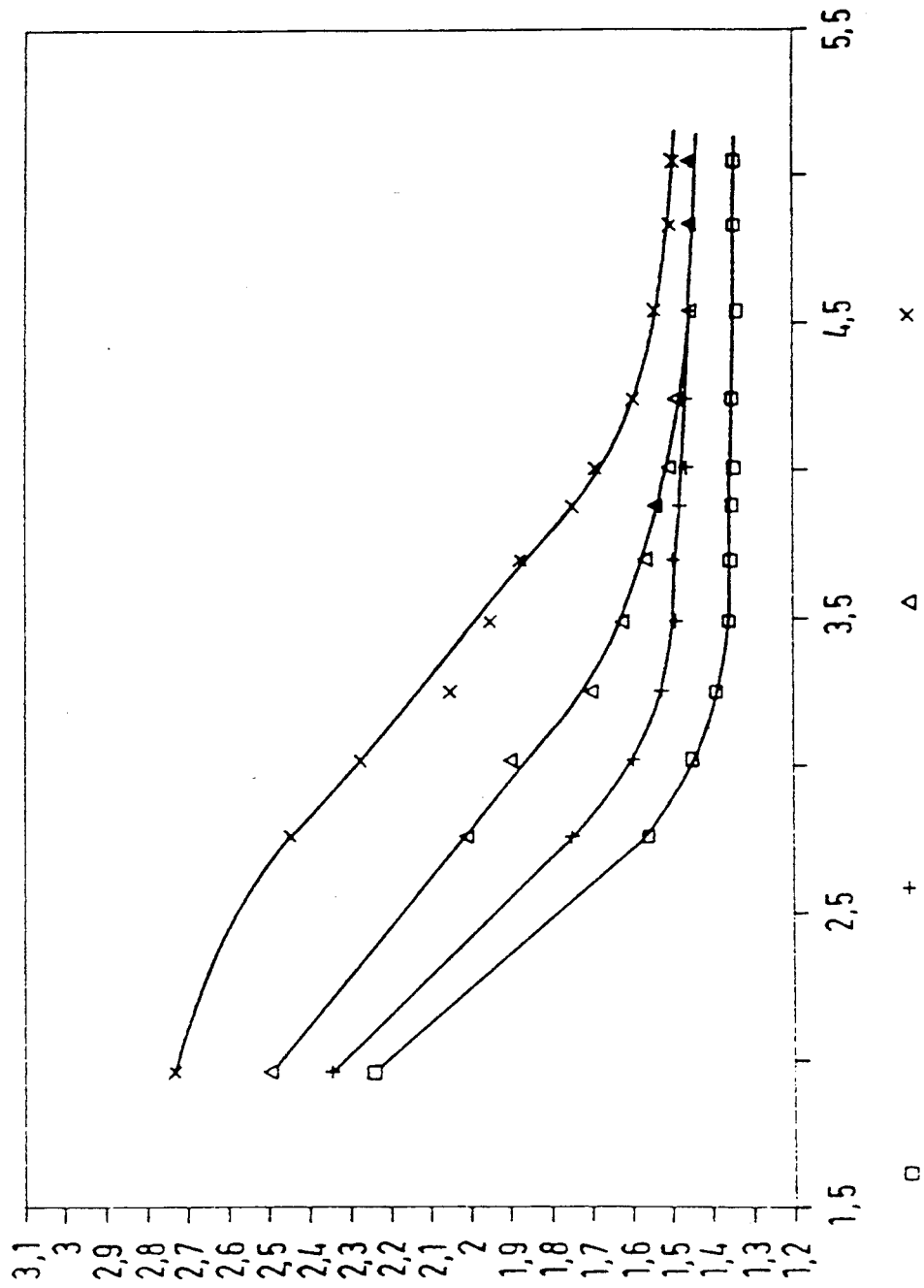

Substances prepared in this manner are excellent packing materials for chromatographic columns, in particular for gel permeation chromatography. One of the features of the invention relating to these GPC materials is that the mesh-lattice of the polymer determining the exclusion limits of the substances to be separated is not controlled by adding conventional bifunctional crosslinking agents. In this case the crosslinking is of a novel sort by means of the number of adhesion groups at the surface. As shown by FIG. 1, the exclusion limits of the GPC can be controlled by the number of adhesion groups at the pore surfaces. They may also be controlled conventionally by adding crosslinking agents, however the chromatographic mass transfer then shall be significantly less advantageous. Furthermore the exclusion limits can be controlled to some extent by the number of polymer chains per cavity or by their degree of polymerization. A lesser number of polymer chains is achieved by shortening the polymerization time (FIG. 2) or by diluting the monomer mixture with a less volatile inert solvent during deposition on the porous material and during the ensuing polymerization (FIG. 3). The degree of polymerization of the chains can be controlled by means of the proportion of initiator, by adding carriers during polymerization or by the polymerization temperature. Again the exclusion limits are affected thereby (FIG. 4). The mass transfer is more advantageous as the degree of polymerization of the chains is less and the material is more easily packed into the columns.

Figure 5A:
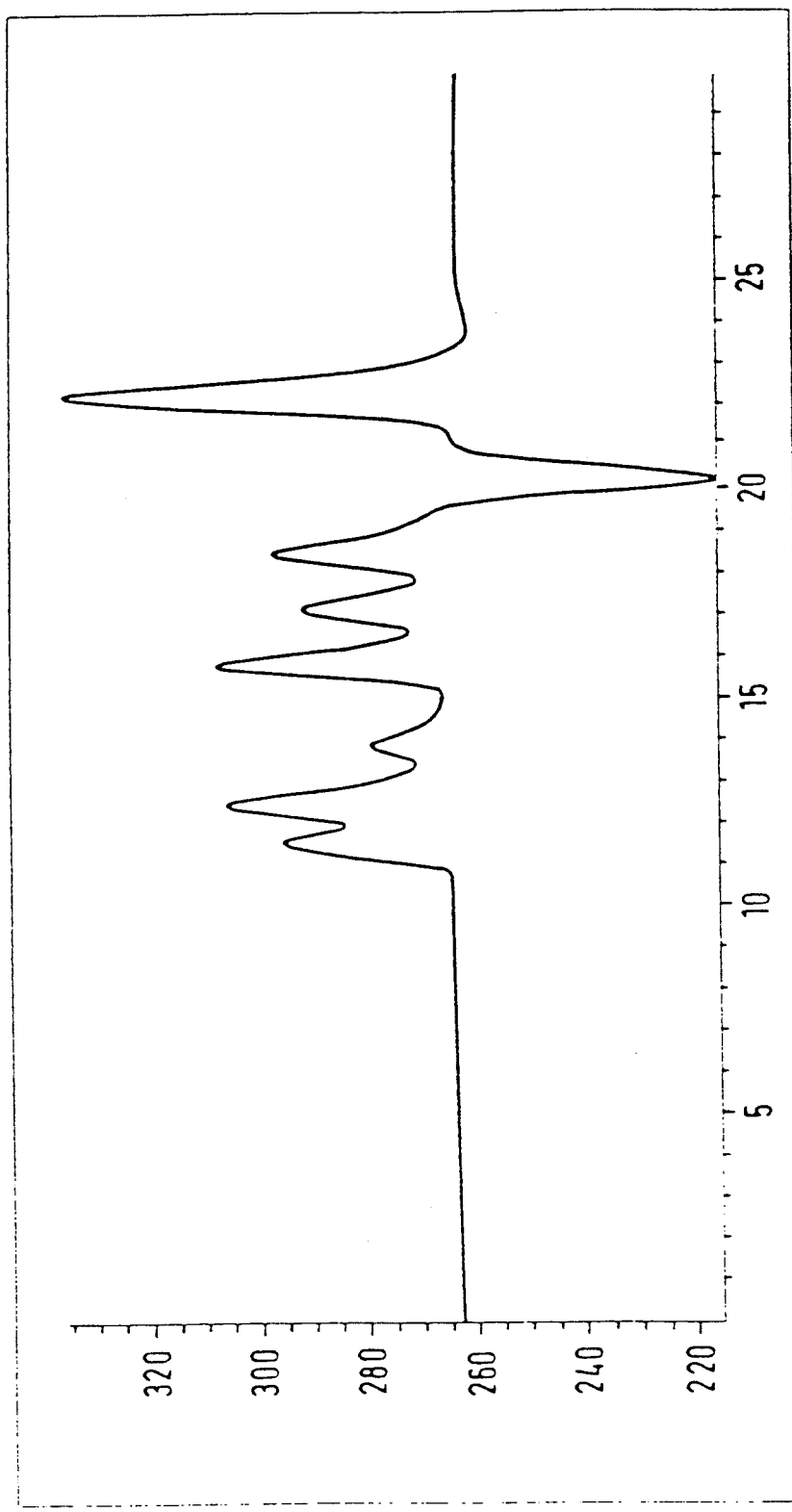
Figure 5B:
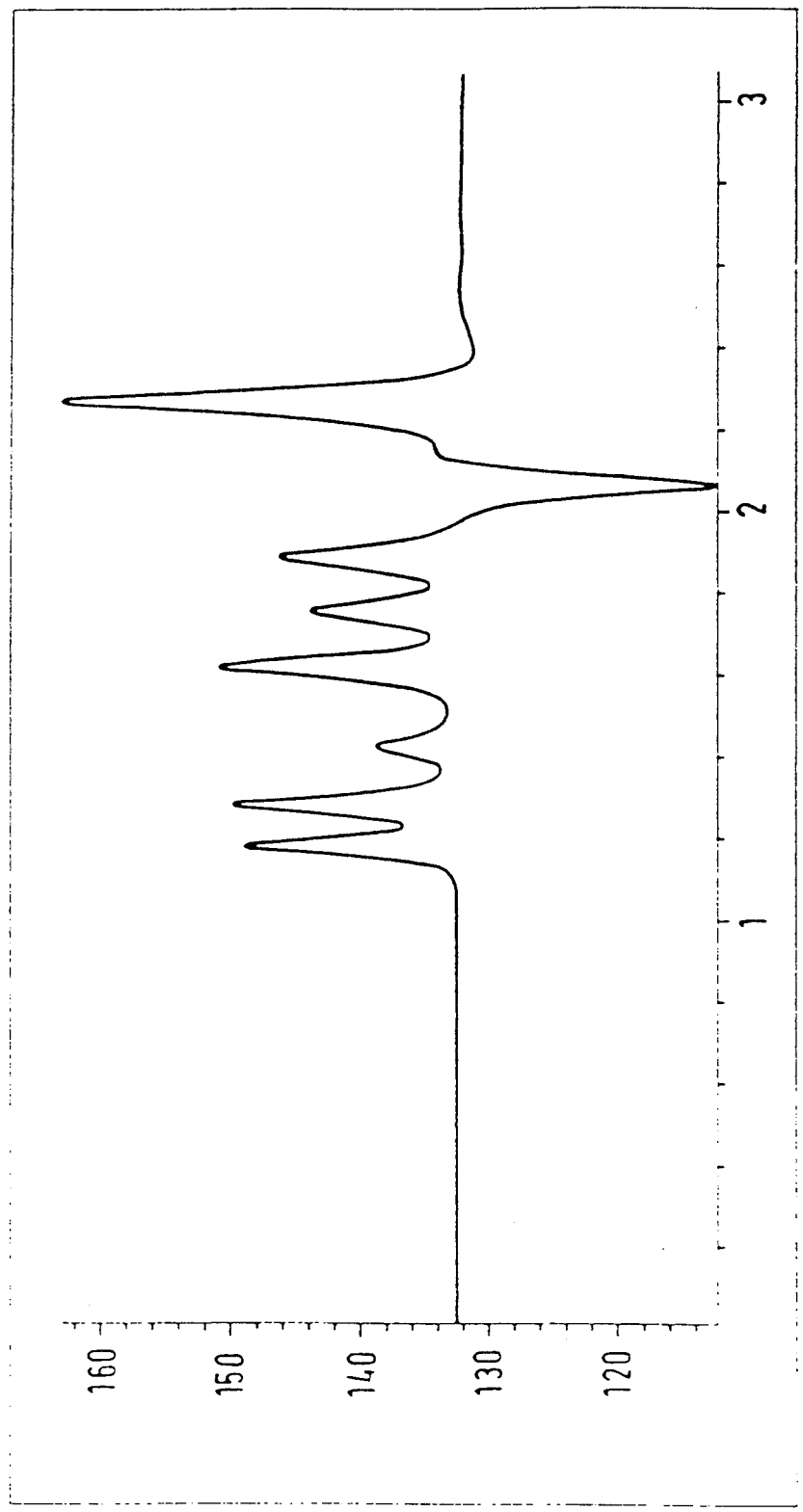
Figure 5C:
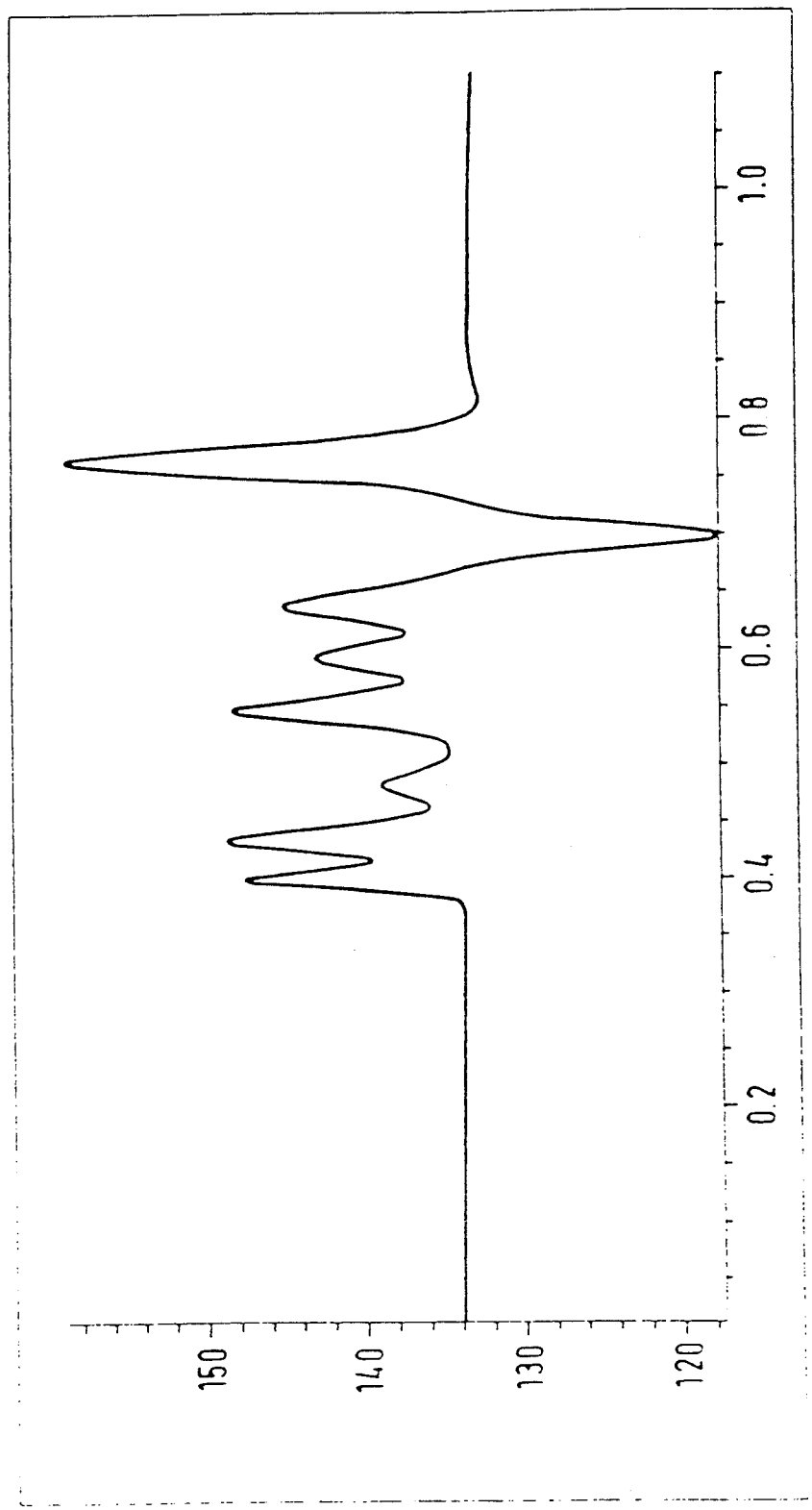
Figure 5D:
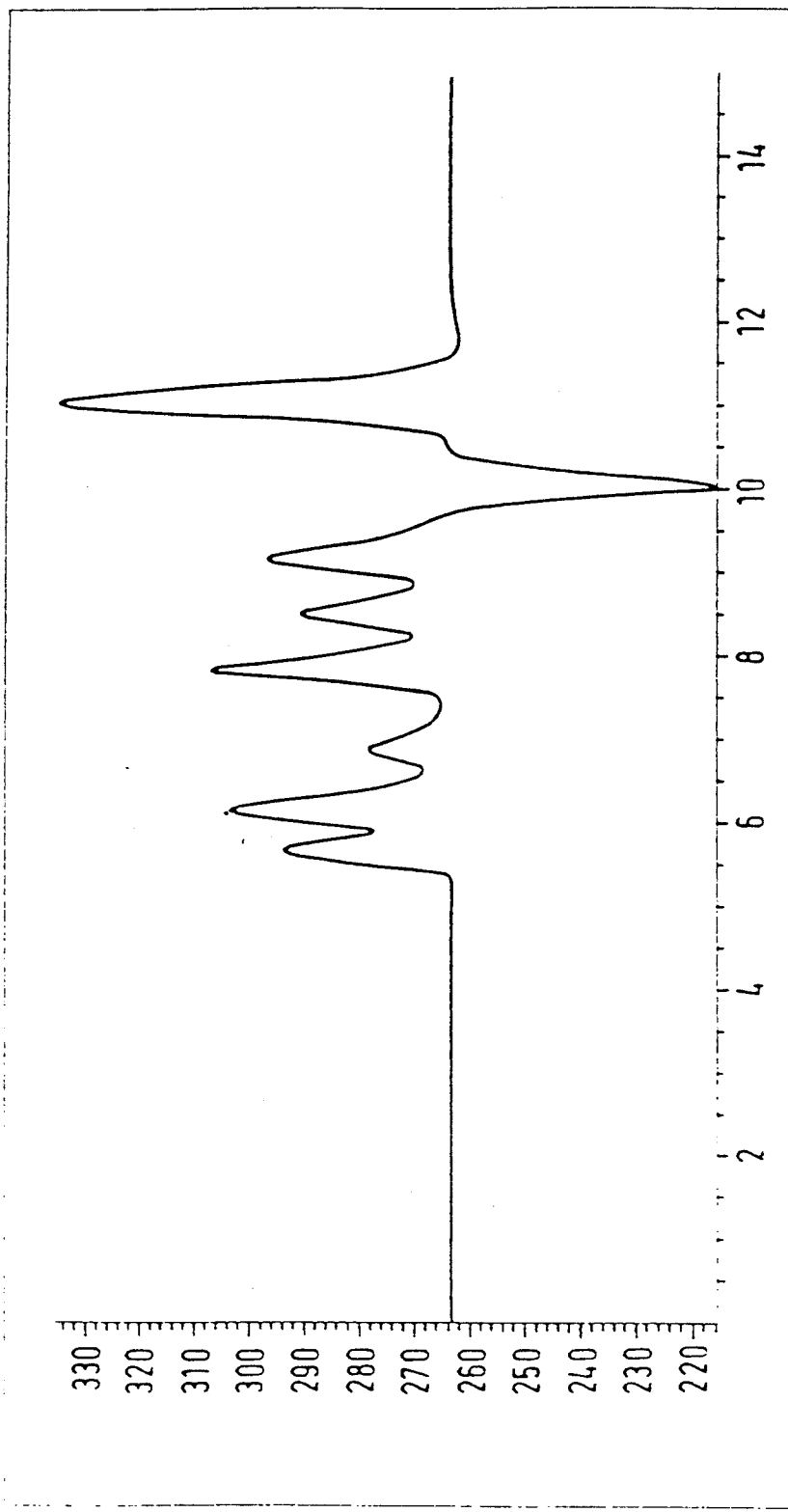
Figure 5E:
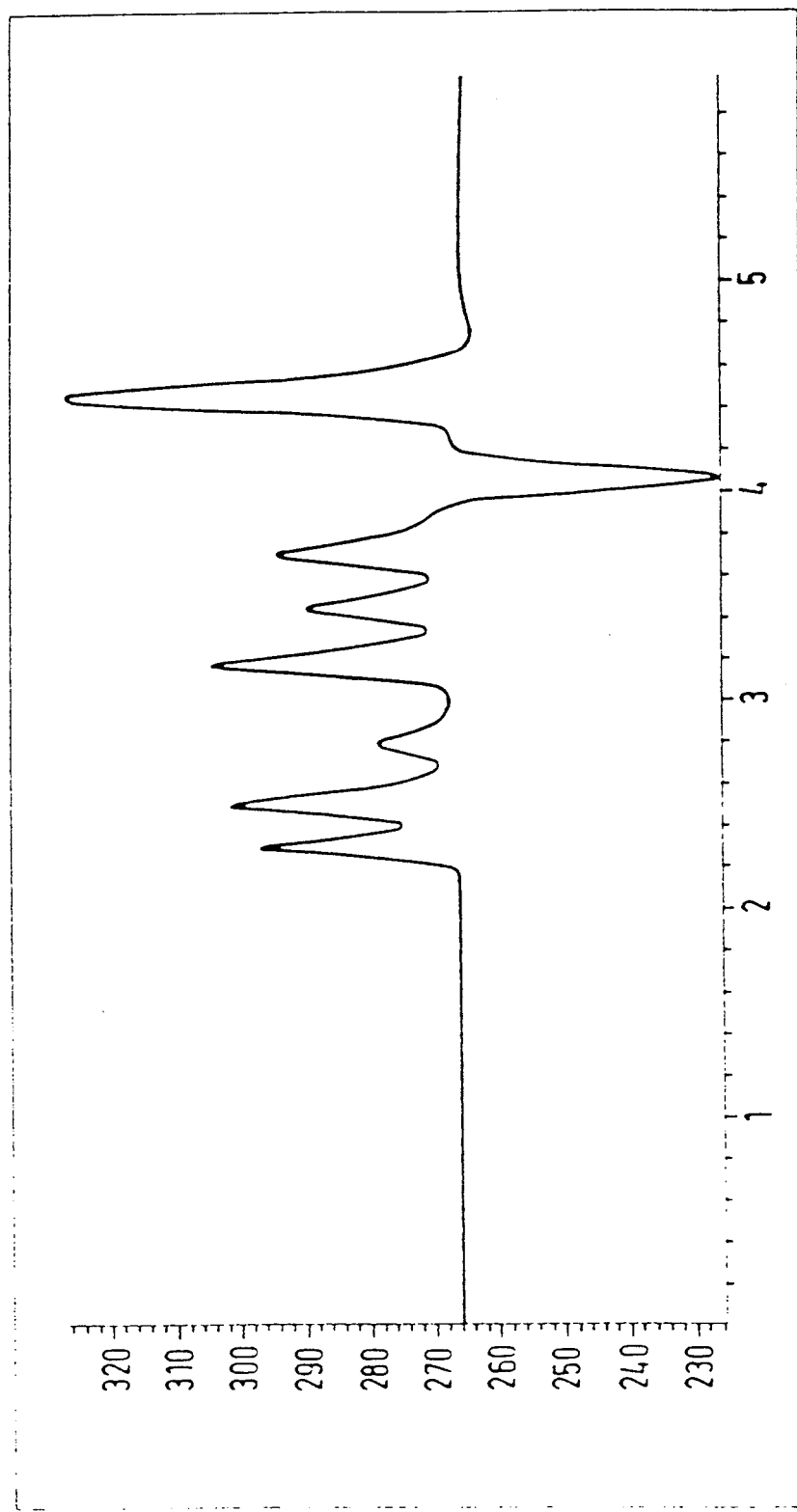
Figure 5F:
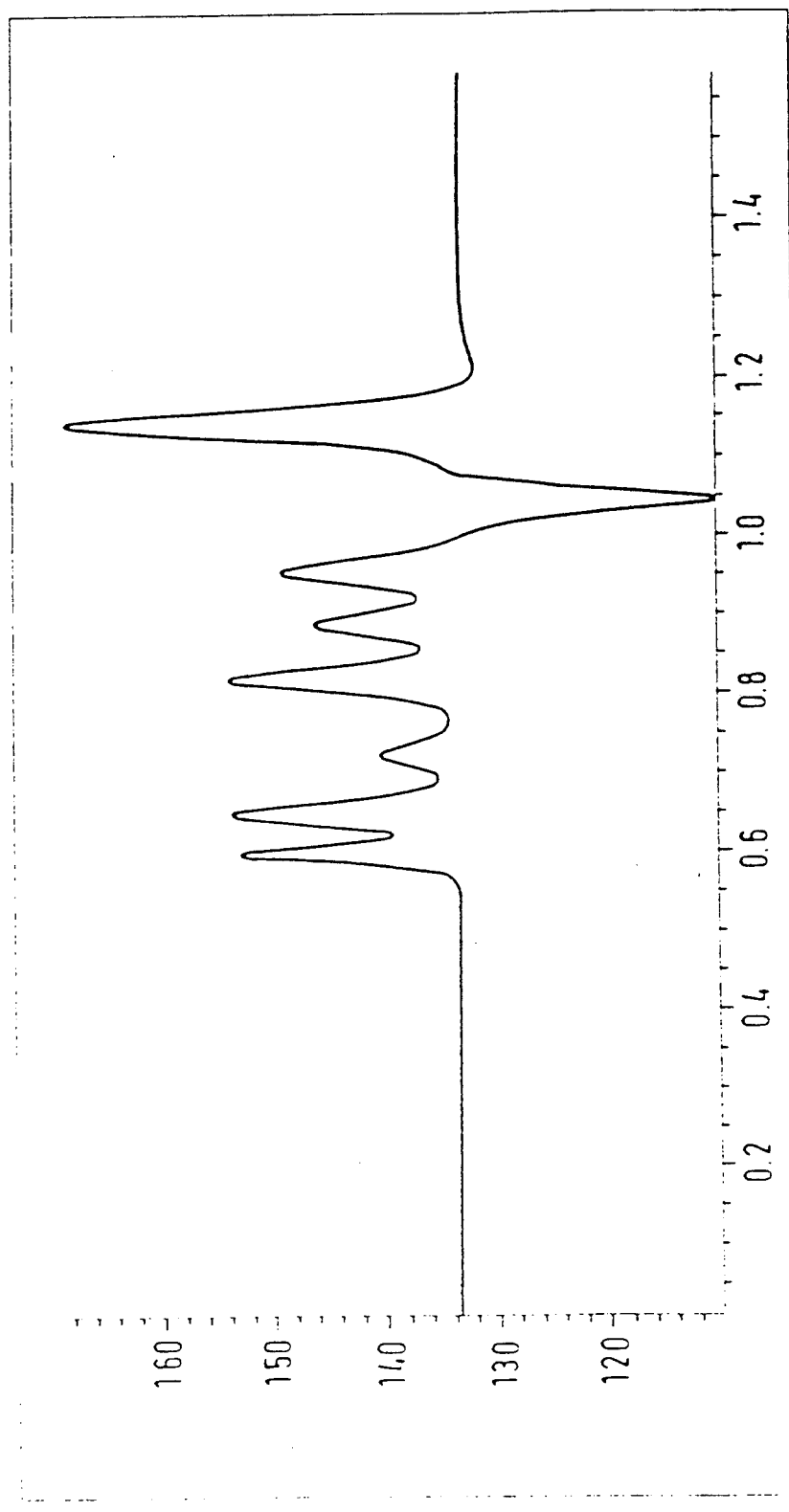

Further advantages of the invention from the materials so prepared are the mechanical strength because the intrinsically soft gel phases are protected by the hard porous structures of the solids. Therefore they may be used at all ordinary pressures occurring in HPLC. As shown by FIGS. 5a-c, the separation efficiency at high flows and high pressures is very good, being a maximum at 1 ml/min, so that separations terminate in 2.4 min. However even at 3 ml/min and 388 bars, separation still is good and ends after 0.8 min. The particles are easily filled while of high quality into the columns and the column contents practically will not swell. Solvents may be directly changed during chromatography without thereby incurring losses in quality. The packed column even may be open for some time and be heated to 80° C. and then be reused. The separation efficiency does not change. Even sudden jumps in pressure cause no degradation of the column packing.

An especially advantageous porous material is silica gel which can be made commercially with tight controls as regards internal volume, pore distribution, particle shape and particle-size distribution.

The preparation of the polymeric gel packings reinforced by silica gel takes place in two steps of the method of the invention.

The first step is carried out at a present-day technical level according to known procedures, however under new experimental conditions. In this step a desired concentration of polymerizing groups shall be bound to the silica-gel surface. Therefore dry silica gel is brought into contact with a compound comprising polymerizing groups, either directly or dissolved in a solvent, and by chemical reaction is bound to the silica gel surface. Suitable modifying reagents illustratively are 3-(trimethoxysilyl)-propylmethacrylate, 4-(dimethylchlorosilyl)-styrene or 4-(trichlorosilyl)-styrene. 4-(dimethylchlorosilyl)-styrene is especially well suited. The concentration of these groups furthermore can be varied by adding varying amounts of trimethylchlorosilane. After the modified silica gel has been thoroughly washed, the residual, still accessible silanol groups on the silica gel surface are end-capped in known manner using a suitable reagent. Suitable reagents for ating the silanol groups are illustratively trimethylchlorosilane,1,1,1,3,3,3-hexamethylenedisilazane (HMDS) or ethoxytrimethylsilane. HMDS is especially gentle.

In the second step of the method of the invention, suitable monomers in concentrations from 0.1 to 1,000% by weight related to the original silica gel are added to the silica gel modified in the manner of the invention to produce polymerization. The monomer already contains a suitable initiator in a concentration of 0.01 to 10% by weight relative to the monomer. Once the monomers have been uniformly spread on the silica-gel surface, polymerization begins. In practice polymerization is achieved using AIBN as initiator at temperatures between 55° and 70° C. Following polymerization, the chemically unbound, eluting polymer is rinsed-out using a suitable solvent. Methylene chloride, toluene or tetrahydrofuran are especially applicable.

The Examples below of practically applications elucidate, without implying restriction, the method of the invention.

EXAMPLE 1

Activation of the silica gel used, namely Matrex Silica Si (mean pore diameter=25 nm, particle size 0.01 mm) made by Amicon Co. (Witten, W. Germany) is carried out by boiling for 2 h in 5% nitric acid, by washing to neutrality with distilled water and by drying at 120° C. in the vacuum oven.

2.5 g of the silica gel so pre-treated were suspended in 25 ml of dry carbon tetrachloride and following addition of 0.021 ml of dry pyridine and 0.023 ml of 4-(dimethylchlorosilyl)-styrene, the mixture was shaken for 2 h at room temperature. After filtering and washing with dry methylene chloride, drying of the modified silica gel was carried out at 40° C. in the vacuum oven. The carbon content of the silica gel so modified was 0.9%, that is, the concentration of the anchor group was about 9% relative to the maximum possible surface coating with anchor groups.

2.5 ml of 1,1,1,3,3,3-hexamethylenedisilazane (HMDS) were added to a suspension of the modified silica gel in 25 ml of dry carbon tetrachloride and the mixture was shaken for 2 h at room temperature. Following filtration and washing with methylene chloride, drying was carried out at 40° C. in the vacuum oven. The carbon content of the silica gel so modified and so end-capped was 4.08%.

3.977 g of styrene and 0.209 g of azo-bis-isobutyronitrile (AIBN) were added to a suspension of 2.2 g of the modified and end-capped silica gel in 25 ml of dry methylene chloride. Following shaking of the suspension and removal of the methylene chloride in a rotary evaporator at water-jet vacuum, further repeated purging with $N_2$ the reaction flask and ensuing application of a vacuum of about 120 mbars, polymerization was carried out for three days at 70° C.

After polymerization the silica gel polymer was suspended in 50 ml of methylene chloride and shaken for 6 h. After filtration and thorough washing, drying was carried out at 40° C. in the vacuum oven. The carbon content of the silica gel was 24.5%, that is, in relation to the initial silica gel, a total of 37.8% of organic compounds and polymer had been added.

EXAMPLE 2

The activation of the silica gel used, i.e. Matrex Silica SI (mean pore diameter 25 nm, particle size 0.01 mm) from Amicon Co. (Witten, West Germany) was carried out by boiling for 2 h in 5% nitric acid, washing to neutrality with distilled water and drying in the vacuum oven at 120° C.

Next, 7.5 g of this pre-treated silica gel were suspended in 75 ml of dry carbon tetrachloride, then 1.95 ml of dry pyridine and a mixture consisting of 0.261 ml of 4-(dimethylsilyl)-styrene and 1.910 ml of chlorotrimethylsilane were added and the substance was allowed to stand for 20 h at room temperature with occasional shaking. Following filtration and washing with dry methylene chloride, the modified silica gel was dried at 40° C. in the vacuum oven. The carbon content of the silica gel so modified was 4.77%.

16.703 g of styrene and 0.879 g of azo-bis-isobutyronitrile (AIBN) were added to a suspension consisting of 7.0 g of the modified silica gel in 70 ml of dry methylene chloride. After shaking the suspension and removing the methylene chloride using the rotary evaporator at water jet vacuum, also by repeatedly purging with $N_2$ the reaction flask and subsequent application of a vacuum of about 120 mbars, polymerization was carried out at 70° C. for three days.

After the polymerization, the silica gel was suspended twice in 100 ml of methylene chloride and shaken for 6 h. Following filtration and thorough washing, drying was carried out at 40° C. in the vacuum oven.

The carbon content of the silica-gel polymer was 31.9%. In relation to the initial silica gel, a total of 55.6% of organic compounds and polymer had been added.

EXAMPLE 3

The silica gel used, namely Matrex Silica Si (mean pore diameter 25 nm, mean particle size 0.01 mm) made by Amicon Co. (Witten, West Germany) was carried out by boiling for 2 h in 5% nitric acid, by washing to neutrality with distilled water and drying in the vacuum oven at 120° C.

5 g of the silica gel so pre-treated were suspended in 50 ml of dry carbon tetrachloride and following addition of 0.273 ml of 3-(trimethoxysilyl)-propylmethacrylate, the mixture was heated to boiling with reflux for 8 h. Following filtration and washing with dry methylene chloride, the modified silica gel was dried at 40° C. in the vacuum oven. The carbon content of the silica gel so modified was 5.31%.

5 ml of 1,1,1,3,3,3-hexamethylene disilazane (HMDS) were added to a suspension of the modified silica gel in 50 ml of dry carbon tetrachloride and this mixture was agitated for 2 h at room temperature. Following filtration and washing with methylene chloride, drying was carried out at 40° C. in the vacuum oven. The carbon content of the silica gel so modified and end-capped was 5.64%.

3.268 g of 2-hydroxyethyl methacrylate and 0.084 g of azo-bis-isobutyronitrile (AIBN) were added to a suspension of 4 g of the modified and end-capped silica gel in 50 ml of dry methylene chloride. After shaking the suspension and removing the methylene chloride using the rotary evaporator at water-jet vacuum, also upon repeatedly purging the reaction flask and then applying a vacuum of about 120 mbars, polymerization was carried out at 70° C. for three days. After this polymerization the silica- gel polymer was suspended in 100 ml of methanol and agitated for 6 h. Following filtration and thorough washing of the material, drying was carried out at 40° C. in the vacuum oven. The carbon content of the silica-gel polymer was 27.67%. Computed in relation to the initial silica gel, approximately 99.2% of organic compounds and polymer had been added.

EXAMPLE 4

The silica gel used, namely Nucleosil 300-5 (mean pore diameter 30 nm, particle size 0.005 mm) made by Macherey und Nagel (Düren, West Germany), was activated by boiling for 2 h in 5% nitric acid, by washing to neutrality with distilled water and drying in the vacuum oven at 120° C.

5.0 g of the silica gel so pre-treated were suspended in 50 ml of dry carbon tetrachloride, and, following addition of 0.7 ml of dry pyridine and a mixture of 0.070 ml of 4-(dimethylsilyl)-styrene and 0.466 ml of chlorotrimethylsilane, this material was allowed to stand at room temperature for 20 h with occasional agitation. After filtration and washing with dry methylene chloride, the modified silica gel was dried at 40° C. in a vacuum oven. The carbon content of the silica gel so modified was 1.59%.

9.09 g of styrene and 0.478 g of azo-bis-isobutyronitrile (AIBN) were added to a suspension consisting of 5.0 g of the modified silica gel in 50 ml of dry methylene chloride. After shaking the suspension and removing the methylene chloride by means of the rotary evaporator at water-jet vacuum, also upon purging with $N_2$ the reaction flask several times and then applying a vacuum of about 120 mbars, polymerization was carried out for three days at 70° C.

Upon polymerization, the silica-gel polymer was suspended twice in 100 ml of methylene chloride and agitated for 6 h. After filtration and thorough washing, drying was carried out at 40° C. in the vacuum oven.

The carbon content of the silica gel polymer was 16.81%. Relative to the initial silica gel, a total of 22.3% of organic compounds and polymer were computed to have been added.

EXAMPLE 5

The silica gel used, namely Matrex Silica Si (mean pore diameter 25 nm, particle size 0.01 mm) made by Amicon Co. (Witten, West Germany), was activated by boiling for 2 h in 5% nitric acid, washing to neutrality with distilled water and drying in the vacuum oven at 120° C.

5 g of the silica gel so pre-treated were suspended in 50 ml of dry carbon tetrachloride and, following addition of 1.95 ml of dry pyridine and 2.13 ml of 4-(dimethylchlorosilyl)-styrene, this mixture was agitated for 2 h at room temperature. After filtration and washing with dry methylene chloride, drying of the modified silica gel was carried out at 40° C. in the vacuum oven. The carbon content of the silica gel so modified was 9.79%.

5.0 ml of 1,1,1,3,3-hexamethylenedisilazane (HMDS) were added to a suspension of the modified silica gel in 50 ml of dry carbon tetrachloride and this mixture then was shaken for 2 h at room temperature. Following filtration and washing with methylene chloride, drying was carried out at 40° C. in the vacuum oven. The carbon content of the silica gel so modified and end-capped was 10.0%.

5.966 g of styrene and 0.314 g of azo-bis-isobutyronitrile (AIBN) are added to a suspension composed of 5 g of the modified and end-capped silica gel in 50 ml of dry methylene chloride. After agitating the suspension and removing the methylene chloride at the rotary evaporator in water-jet vacuum, and after repeatedly purging with $N_2$ the reaction flask and then applying a vacuum of about 120 mbars, polymerization was carried out for three days at 70° C.

Following the polymerization, the silica-gel polymer was suspended in 75 ml of methylene chloride and shaken for 6 h. After filtration and thorough washing, drying took place at 40° C. in the vacuum oven. The carbon content of the silica-gel polymer was 46.71%, that is, with respect to the initial silica gel, a total of 102.6% of organic compounds and polymer had been added.

EXAMPLE 6

Activation of the silica gel used, namely LiChrosorb Si 100 (mean pore diameter 10 nm, particle size 0.01 mm) made by Merck Co. (Darmstadt, West Germany) was carried out by boiling for 2 h in 5% nitric acid, washing to neutrality and drying in the vacuum oven at 120° C.

5.0 g of the silica gel so pre-treated were suspended in 50 ml of dry carbon tetrachloride and following addition of 1.94 ml of dry pyridine and 2.279 ml of 4-(dimethylchlorosilyl)-styrene, this mixture was shaken for 2 h at room temperature. After filtration and washing with dry methylene chloride, drying of the modified silica gel was carried out at 40° C. in the vacuum oven. The carbon content of the silica gel so modified was 9.47%.

5.0 ml of 1,1,1,3,3,3-hexamethylenedisilazane (HMDS) were added to a suspension of the modified silica gel in 50 ml of dry carbon tetrachloride and this mixture was then agitated for 2 h at room temperature. After filtration and washing with methylene chloride, drying was carried out at 40° C. in the vacuum oven. The carbon content of the silica gel so modified and end-capped was 9.85%.

11.931 g of styrene and 0.62 g of azo-bis-isobutyronitrile (AIBN) were added to a suspension composed of 5 g of the modified and end-capped silica gel in 50 ml of dry methylene chloride. After agitating the suspension and removing the methylene chloride using the rotary evaporator and at water-jet vacuum, and after repeatedly purging with $N_2$ the reaction flask and then applying a vacuum of about 120 mbars, polymerization was carried out for three days at 70° C.

Following the polymerization, the silica-gel polymer was suspended in 75 ml of methylene chloride and shaken for 6 h. After filtration and thorough washing, drying was carried out in the vacuum oven at 40° C. The carbon content of the silica-gel polymer was 46.58% which relative to the original silica gel is computed to amount to a total addition of 102% of organic compounds and polymer.

EXAMPLE 7

The silica gel used, namely Matrex silica Si (mean pore diameter 25 nm, particle size 0.01 mm) made by Amicon Co. (Witten, W. Germany), was activated by boiling for 2 h in 5% nitric acid, by washing to neutrality with distilled water and by drying at 120° C. in the vacuum oven.

5 g of the pre-treated silica gel were suspended in 25 ml of dry carbon tetrachloride and, following addition of 1.95 ml of dry pyridine and of 2.164 ml of 4-(dimethylchlorosilyl)-styrene, the mixture was agitated for 2 h at room temperature. After filtration and washing with dry methylene chloride, the modified silica gel was dried at 40° C. in the vacuum oven. The carbon content of the silica gel so modified was 9.79%.

5 ml of 1,1,1,3,3,3-hexamethylenedisilazane (HMDS) were added to a suspension of the modified silica gel in 50 ml of dry carbon tetrachloride and the mixture was agitated for 2 h at room temperature. Following filtration and washing with methylene chloride, drying was carried out at 40° C. in the vacuum oven. The carbon content of the silica gel so modified and end-capped was 10.0%.

3.18 g of styrene, 9.104 g of toluene and 0.167 g of azo-bis-isobutyronitrile (AIBN) were added to a suspension composed of 4 g of the modified and end-capped silica gel in 40 ml of dry methylene chloride. After shaking the suspension and removing the methylene chloride by means of the rotary evaporator and at water-jet vacuum, and after repeatedly purging the reaction flask with $N_2$ and ensuing application of a vacuum of about 120 mbars, the polymerization was carried out at 70° C. for three days.

Following the polymerization, the silica gel polymer was suspended in 50 ml of methylene chloride and agitated for 6 h. After filtration and thorough washing, drying was carried out at 40° C. in the vacuum oven. The carbon content of the silica-gel polymer was 31.3%, that is, in relation to the initial silica gel, a total of 51.5% of organic compound and polymer were computed to have been added.

EXAMPLE 8

The hydroxyethylmethacrylate of mean pore diameter of 100 nm (HEMA from Polymer Standards, Mainz, West Germany) was dried at 40° C. in the vacuum oven.

5 g of the dried HEMA 1000 were suspended in 100 ml of dry methylene chloride and following addition of 0.1 ml of dry pyridine and 0.05 ml of methacrylic-acid chloride, the mixture was agitated at room temperature for 2 h. After filtration and washing with methylene chloride, drying was carried out at 40° C. in the vacuum oven.

5.0 g of 2-hydroxyethylmethacrylate and 0.263 g of AIBN were added to a suspension of 50 ml of dry methylene chloride and of 5 g of the modified HEMA. After shaking the suspension and removing the methylene chloride using the rotary evaporator at water-jet vacuum, and after purging the reaction flask several times with $N_2$, and thereupon applying a vacuum of about 120 mbars, polymerization was carried out at 70° C. for three days.

Following polymerization, the modified HEMA was suspended in 100 ml of methanol and agitated for 6 h. After filtration and thorough washing, drying was carried out at 40° C. in the vacuum oven.

EXAMPLE 9

Activation, modification and polymerization of the silica gel Matrex silica Si (mean pore diameter 25 nm, particle size 0.005 mm) from Amicon Co. (Witten, W. Germany) takes place as in Example 2.

3.5 g of the polymerically modified silica gel of Example 2 are suspended in 125 ml of dry xylene and following addition of 2.5 g of 1,1,1,3,3,3-hexamethyl-disilazane (HMDS) the mixture is boiled with reflux for 20 h. After filtering and washing with methylene chloride, drying takes place at 40° C. in the vacuum oven.

Accurate material data:
Base material: Matrex silica Si
Mean pore diameter: 25 nm
Particle size: 0.005 mm
Specific surface 292 $m^2/g$
Modified silica gel
Specific surface: 215.4 $m^2/g$
Carbon content: 4.77%
Polymer-modified silica gel
Specific surface: 151.4 $m^2/g$
Carbon content: 31.9%
Column packing (by the slurry method) 2.25 g of polymerically modified silica gel 45 ml of methanol/dioxan (2/1)
Mobile solvent: methanol/dioxan (2/1)
Pressure: 300 bars
Flow: about 4.5 ml/min
Duration 2.5 h
Column dimensions: 250×4 mm

LEGENDS OF FIGURES

FIG. 1: Variation of anchor group concentrations

Comparison of eluted volumes of chromatographic materials for GPC, differing only in the concentrations of the anchor groups (4-vinyl-phenyl-siloxane) and thereby resulting in different exclusion limits for substances of different molecular weights. The reference is non-modified silica gel (pure). The fraction of maximum possible anchor-group concentration (⅓; 1/11; 1/31; 1/100) is stated each time.

Figure 2:
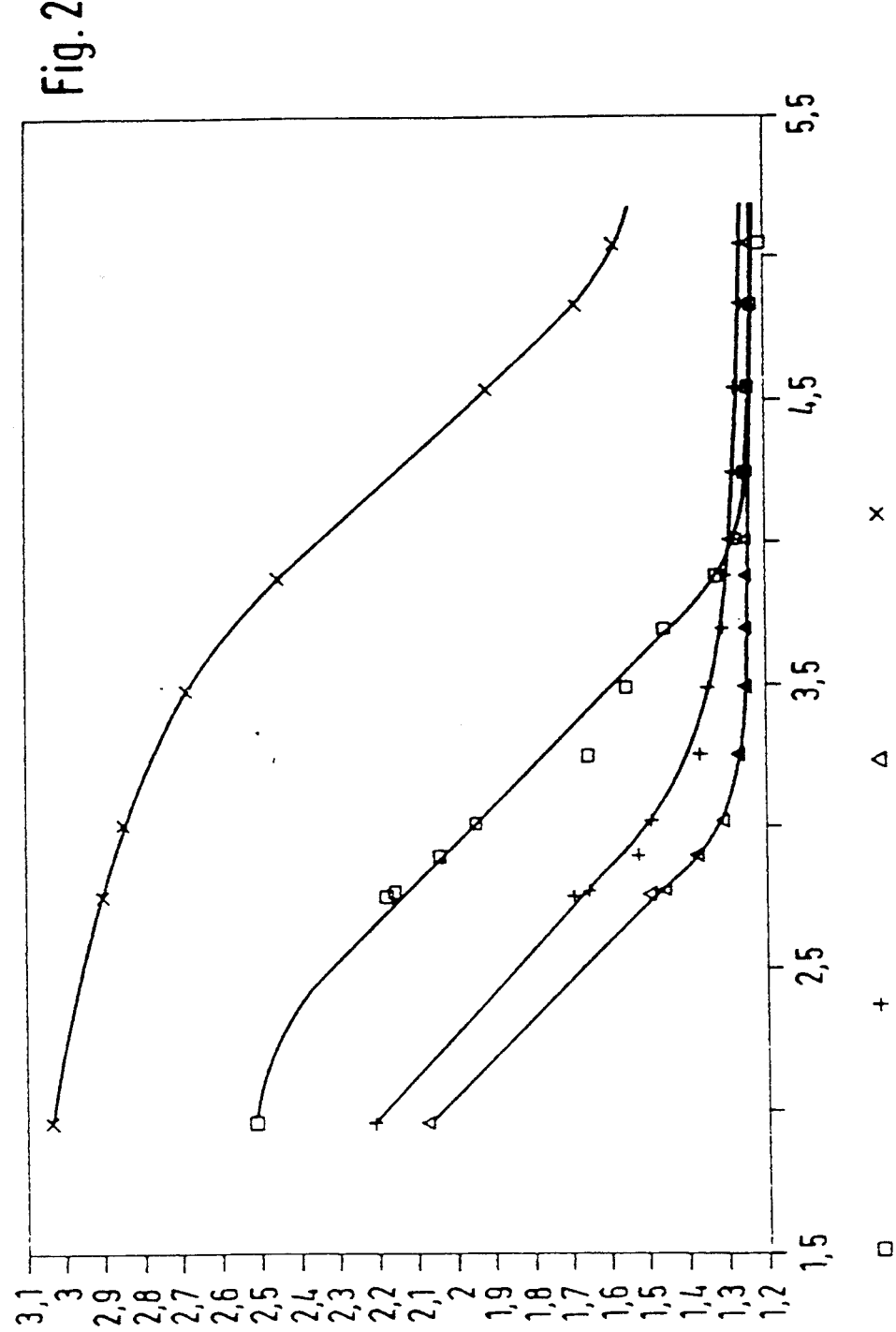

FIG. 2: Variation of polymerization time

For a silica gel with 1/11 of the possible anchor groups, the polymerization times were varied while keeping other conditions constant and the GPC behavior of the resulting materials was ascertained.
pure=reference silica gel, unmodified; durations: 1 h; 2 h; 4 h.

FIG. 3: Variation in inert solvents

Other conditions being kept constant, the monomer was diluted during manufacture with an inert solvent (toluene) and the GPC behavior of the resulting materials was ascertained. 1/0= no dilution; in the other tests, dilution to 1, 3, 7, 11 parts by volume of monomer to 15 parts by volume of inert solvent.

FIG. 4: Variation in AIBN concentration

Keeping the other conditions constant, the initiator (AIBN) concentration was varied and thereupon the GPC behavior of the materials was ascertained.

There were 0.1, 1.0, 2.5 and 5% by weight of AIBN per monomer portion.

FIGS. 5 $a$–$f$

These are gel-chromatographic separations of polystyrene 111 000 (PST-111000), polystyrene 5000 (PST 5000), tristearin, triacontane (C 30), eicosane (C20), tetradecane (C 14), octane (C 8) and benzene at various flows. The column is that of Example 9.

We claim:

1. A method for making column packing material for gel-permation chromatography, comprising the steps of:
   a) providing support particles having a mean particle diameter of 1 to 50μ, the matrix of the particles selected from the group consisting of porous inorganic material chemically modified to provide bonding sites therein and organic polymeric and porous hard material with a mean pore diameter of 6 to 500 nm and a pore volume of 0.1 to 3 ml/g; and
   b) filling the pores of the support particles with polymer chains chemically bound to the surfaces of the pores, the polymer chains being permeable to solvent and partially dissolved substances.

2. Method defined in claim 1, characterized in that first anchor groups, which optionally are polymerizing, are bound in covalent manner to the surface of the support particles, and then a polymerizing mixture of monomers and a polymerization initiator are polymerized so that the covalently-bound polymer shall fill the free spaces of the pores of the support particles.

3. Method defined in claim 2, characterized in that the mixture of monomers is diluted with an inert solvent of high boiling point selected from the group consisting of toluene and xylene.

4. Method defined in claim 2, characterized in that the mixture of monomers is diluted with an inert solvent of high boiling point selected from the group consisting of toluene and xylene, whereby the quantity of polymer formed in the pores may be varied so that the apparent porosity can be controlled.

5. Method defined in claim 1, wherein a member from the group consisting of polymerizing groups with double bonds, carboxyl groups, amino groups, hydroxyl groups and groups for binding finished polymers in the form of organosilanes are bound by means of siloxane groups to the surface of the support particles, the concentration of these groups being set to between 0.01 and 6 μmole/$m^2$ by one of mixing with an excess of polymerization-inactive silane selected from the group consisting trimethylchlorosilane and hexamethyldisilazane and strong dilution where, after binding the organosilanes, the remaining silanol groups are optionally endcapped as completely as possible by means of one of using a member selected from the group consisting of trimethylchlorosilane and hexamethylenedisilzane and by reaction in carbon tetrachloride at room temperatures or up to 100° C.

6. Method defined in claim 1, characterized in that a mixture of monomer from the group consisting of styrene, methylmethacrylate, acrylamide and hydroxyethylene methacrylate, and initiators from the group consisting of azo-bis-isobutyronitrile and benzoyl peroxide in a volatile solvent selected from the group consisting of ethylene chloride, tetrahydrofuran, and diethylether is deposited as initial material on the porous support particles modified with anchor groups, in that the solvent is removed in a vacuum of 50 to 0.1 mbars and at 0° to 60° C., that polymerization takes place after purging with nitrogen at a temperature of 30° to 120° C. during a time of 1 to 100 hours, and the excess of polymer not covalently bound to the support particles is extracted using a solvent dissolving this polymer.

7. Method defined in claim 1, characterized in that an excess of monomer volume relative to the pore volume of the support particles is used in a proportion of 105 to 400% and that the polymer proportion which is not bound covalently is dissolved away after polymerization using a solvent selected from the group consisting of methylene chloride, toluene, acetic ester, methanol and water.

8. Method defined in claim 1, including the step of:
a) providing inorganic support particles selected from the group consisting of porous silica gels, aluminum oxide, glass, zeolite and Celites.

9. Method of claim 1, including the step of:
a) providing organic support particles selected from the group consisting of macroporous polymers based on vinyl or on viniyidene polymers, having halide or ester groups, methacrylates, and acrylates, with or without conventional crosslinking agents from the group consisting of divinylbenzene, glycol dimethacrylate, and methylene-bis-acrylamide.

10. Method of claim 1, including the step of:
a) providing porous silica gel as the support particles.

* * * * *

UNITED STATES PATENT AND TRADEMARK OFFICE
CERTIFICATE OF CORRECTION

PATENT NO. : 5,164,427

DATED : November 17, 1992

INVENTOR(S) : Wulff et al

It is certified that error appears in the above-indentified patent and that said Letters Patent is hereby corrected as shown below:

Title page, item [56] References Cited, under FOREIGN PATENT DOCUMENTS, add the following:

3536397    4/1986    Federal Republic of Germany
    3619303    12/1987    Federal Republic of Germany Under OTHER PUBLICATIONS, add the following:

Kremmer, et al, Gel Chromatography, 1979, pp. 67-68.
    Brock, Membrane Filtration, 1983, pp. 290-291.

Under OTHER PUBLICATIONS, make the following change to the Monrabal entry:

Change "pp. 79-90" to -- pp. 79-98 --.

Signed and Sealed this

Twenty-second Day of February, 1994

*Attest:*

BRUCE LEHMAN

*Attesting Officer*    Commissioner of Patents and Trademarks